(12) United States Patent
Palve et al.

(10) Patent No.: US 12,204,164 B2
(45) Date of Patent: Jan. 21, 2025

(54) CAMERA ASSEMBLY MOUNTED TO A MOUNTING SURFACE OF A CAMERA ENCLOSURE

(71) Applicant: Microsoft Technology Licensing, LLC, Redmond, WA (US)

(72) Inventors: Lalit Anil Palve, Seattle, WA (US); Karlton David Powell, Lake Stevens, WA (US); Rhishikesh A. Sathe, Bothell, WA (US); Marlo Elizabeth Castillo, Kenmore, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 774 days.

(21) Appl. No.: 17/316,628

(22) Filed: May 10, 2021

(65) Prior Publication Data
US 2022/0357546 A1 Nov. 10, 2022

(51) Int. Cl.
*G02B 7/02* (2021.01)
*G02B 13/06* (2006.01)
*G03B 17/12* (2021.01)

(52) U.S. Cl.
CPC ............ *G02B 7/021* (2013.01); *G02B 7/026* (2013.01); *G02B 13/06* (2013.01); *G03B 17/12* (2013.01)

(58) Field of Classification Search
CPC .......... G02B 7/02; G02B 7/021; G02B 7/022; G02B 7/025; G02B 7/026; G02B 13/06; G03B 17/02; G03B 17/12
See application file for complete search history.

(56) References Cited

U.S. PATENT DOCUMENTS

| 10,270,950 | B2 | 4/2019 | Avalos et al. | |
|---|---|---|---|---|
| 10,530,978 | B2 | 1/2020 | Campbell et al. | |
| 2002/0154419 | A1* | 10/2002 | Shoji | G02B 7/02 359/811 |
| 2004/0109243 | A1 | 6/2004 | Orimo et al. | |
| 2004/0196571 | A1* | 10/2004 | Shinohara | G02B 13/06 359/680 |
| 2009/0059397 | A1* | 3/2009 | Igarashi | G03B 17/563 359/818 |
| 2018/0176429 | A1* | 6/2018 | Avalos | B29C 66/54 |
| 2020/0088976 | A1* | 3/2020 | Song | H04N 23/90 |

FOREIGN PATENT DOCUMENTS

DE 102012206831 A1 10/2013

OTHER PUBLICATIONS

"International Search Report and Written Opinion Issued in PCT Application No. PCT/US22/024134", Mailed Date: Jul. 26, 2022, 10 Pages.

* cited by examiner

*Primary Examiner* — Cara E Rakowski
(74) *Attorney, Agent, or Firm* — CALFEE, HALTER & GRISWOLD LLP

(57) ABSTRACT

A camera assembly for inclusion in a camera is described. The camera assembly includes a lens barrel and a retaining mechanism that is configured to restrict movement of the lens barrel relative to the retaining mechanism. The retaining mechanism is configured to be attached to a mounting surface of a camera enclosure, such that position of the camera assembly remains fixed relative to the camera enclosure.

20 Claims, 16 Drawing Sheets

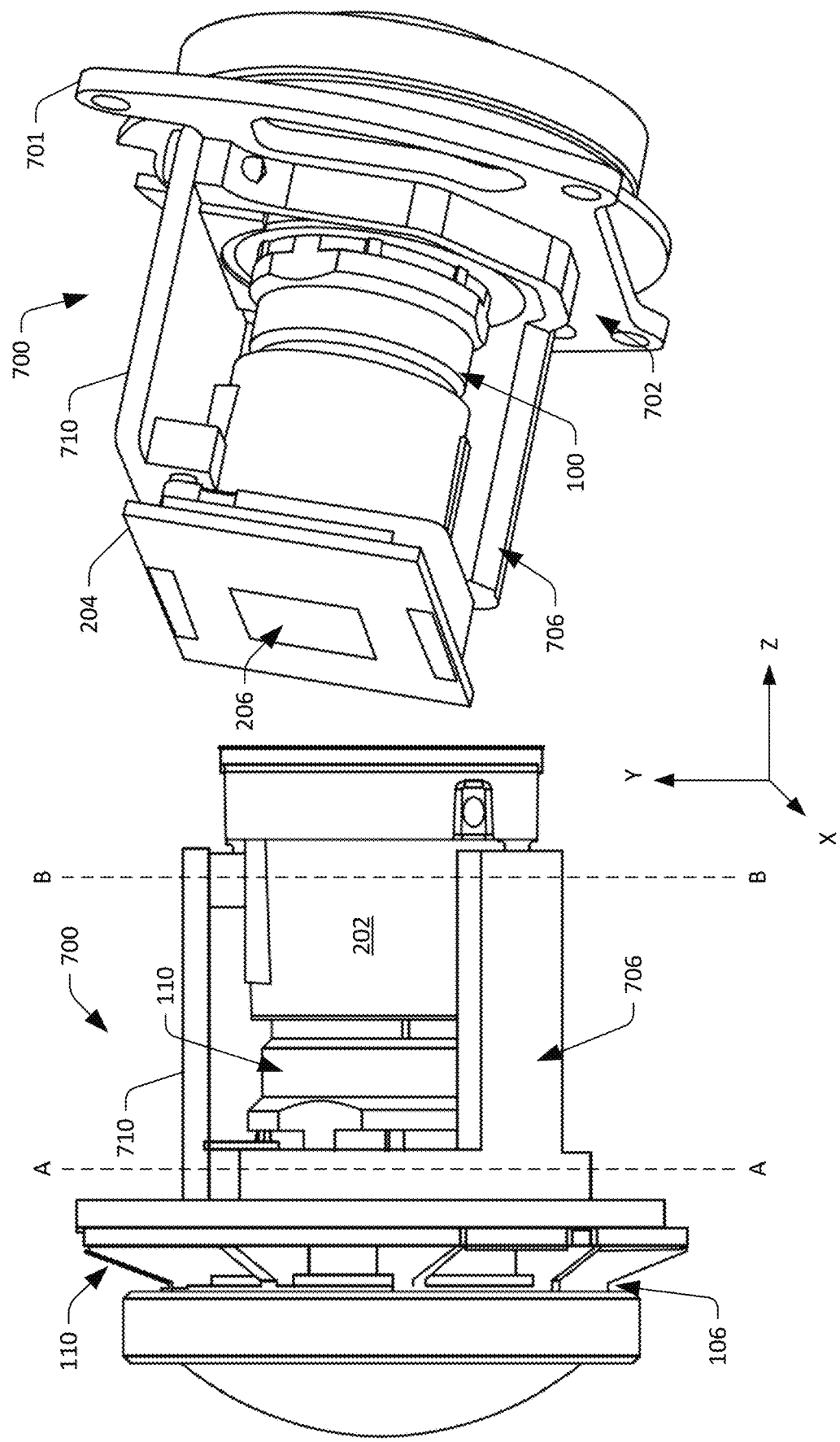

CAMERA ASSEMBLY MOUNTED TO A MOUNTING SURFACE OF A CAMERA ENCLOSURE

BACKGROUND

"Dewarping" refers to the correction of distortions in images, where the images are obtained from a camera that is equipped with a lens having distortion characteristics which do not match the design-intended output distortion correction, e.g., a wide field of view camera intended to support low TV distortion (Gnomonic) output while using an f-theta lens such as a fisheye lens. Currently, a smart artificial intelligence (AI) camera is equipped with optical center (OC)-based dewarping capabilities, and therefore an estimate of the pointing direction of an optical axis of a camera lens of the camera with respect to scene geometry is employed when performing distortion correction. Distortion correction methods that compensate for camera orientation with respect to a scene may involve pitch and/or other angular pointing corrections. Accordingly, in order to optimize dewarp quality, the estimate of the pointing direction of the optical axis must be accurate.

Conventionally, during manufacture of a smart AI camera, an image sensor board that includes an image sensor is mounted to a chassis of a housing; for example, the image sensor board may include several apertures, and the image sensor board is fastened to the chassis by way of threaded fasteners that are placed through the apertures and engaged with correspondingly threaded recesses in the chassis. A lens barrel that includes a camera lens is coupled to a lens holder (e.g., an end of the lens barrel may be threaded and screwed into a correspondingly threaded recess of the lens holder). The lens holder and the lens barrel are coupled to the image sensor board (e.g., the lens holder is screwed to the image sensor board and/or glued to the image sensor board).

During an active alignment procedure, the camera housing is placed at a known position relative to a target with known geometry (e.g., a pattern), such that an optical center (OC) of the camera sensor is aligned properly with respect to the target. Thereafter, an image output by the camera sensor is processed to ascertain whether the target is at a desired position within the image; when the target is not at the desired position, the lens barrel is adjusted in X and Y while the position of the image sensor board remains fixed, and another image output by the camera sensor is processed. These operations are repeated until the target is at the desired position within the image, and the lens holder may be bonded to the image sensor board. It has been ascertained that this approach is suboptimal for smart AI cameras equipped with OC-based dewarping capabilities. For instance, even though the target may be located at a center of an image, optical axis of the lens of the lens barrel may not align with the target, resulting in error with respect to estimating the pointing direction of the lens. Further, when the camera is jostled or dropped, a joint between the image sensor board and the lens holder may weaken (due to masses of lenses in the lens barrel), thereby causing the optical axis of the lens in the lens barrel to deviate further from the estimated pointing direction of the lens, resulting in suboptimal dewarping functionality.

SUMMARY

The following is a brief summary of subject matter that is described in greater detail herein. This summary is not intended to be limiting as to the scope of the claims.

Described herein are various technologies pertaining to utilization of kinematic mounting techniques in connection with mounting a camera assembly in a camera enclosure, where pointing direction of a lens barrel of the camera assembly can be initially relatively precisely estimated and subsequently maintained. During an active alignment procedure, a camera module that includes the lens barrel, a lens holder, and an image sensor board is formed, where an optical axis of the lens barrel is aligned to a target and additionally an image sensor on an image sensor board is aligned with the image of the target in the scene formed by the lens. With more specificity, the lens barrel is initially coupled to the lens holder (e.g., screwed into the lens holder), and the optical axis of the lens barrel is pointed towards a target and then held in position, e.g., the lens barrel is kinematically mounted. Position of the image sensor board is subsequently adjusted relative to the optical axis of the lens barrel, such that a pointing reference pixel position, e.g. center, of the image sensor is aligned with the target and the plane of the image sensor is aligned to the desired (e.g., optimal) focus surface of the image of the target or targets or reticle projector targets in the alignment scene through the lens, which may be orthogonal to the optical axis of the lens barrel; additionally or alternatively, active alignment can be used to account for tip and tilt deviation from orthogonal to the optical axis of the lens barrel. Ultraviolet (UV) curable adhesive, or UV/thermal adhesive, is then applied to an interface between the image sensor board and the lens holder and an interface between the lens barrel and the lens holder to fix position of the lens barrel, the lens holder, and the image sensor relative to one another. In some examples, prefocus is set by curing adhesive between the lens barrel and lens holder prior to active alignment, such that curing the bond line between lens holder and the image sensor board sets focus of the camera module. In some examples, torque between threads of the lens barrel threads of the lens holder is used to temporarily hold the lens barrel relative to lens holder, as a subassembly; during active alignment, the bond line between lens holder and image sensor board is set and cured, and focus is set by refocus of the lens via thread adjustment followed by curing of adhesive placed between lens barrel and lens holder. By aligning the lens to image sensor with the lens barrel providing a mechanical reference of the optical axis, the camera module includes a mechanical reference which may be also used as a mounting reference when aligning and mounting the camera module within a camera assembly to be integrated within a camera enclosure. By utilizing the mechanical reference of optical axis in both active alignment of the camera module and integration of the camera module into the camera assembly and thus camera enclosure, the optical pointing accuracy of a camera may be maintained. In some examples, for further improvement in pointing accuracy, the optical center may be measured after final focus of the camera module is set in order to account for small tolerance errors in the calibrated target scene, and such offsets from ideal optical center may be used in dewarp.

Kinematic mounting techniques are employed to avoid stress on the bond line between the image sensor board and the lens holder and thus mitigate external forces on the adhesive joints, which may cause position of the optical axis of the lens barrel to shift relative to the image sensor (e.g., translate in X, Y, or Z relative to the image sensor, rotate relative to the image sensor, or tilt in azimuth or vertical relative to the image sensor). With more particularity, a camera assembly that is mechanically couplable to a mounting surface (e.g., chassis) of a camera is described herein, where the camera assembly includes the camera module, a retaining mechanism, and a barrel retainer. The lens barrel has a circular cross section and includes a flange at a first end of the lens barrel. The flange has a planar surface that faces a second (narrower) end of the lens barrel that is opposite the first end of the lens barrel. The lens barrel further includes a grip region that extends from the flange towards the second end of the lens barrel, where a center of gravity of the camera module is within the grip region.

The lens holder includes pins that extend from a planar face of the lens holder towards the first end of the lens barrel. The retaining mechanism holds the lens barrel at the grip region; for example, the retaining mechanism includes a V-block that comprises planar surfaces, and the grip region of the lens barrel rests in the V-block such that two of the planar surfaces of the V-block are in contact with the grip region of the lens barrel, thus transferring or maintaining a mechanical reference of the optical axis of lens barrel of the camera module to the retaining mechanism. The barrel retainer is coupled to the retaining mechanism, where a gasket is coupled to the barrel retainer. The gasket is in contact with the grip region of the lens barrel. In an example, the barrel retainer has a concave surface that faces the convex surface of the grip region of the lens barrel, and the gasket is adhered to the convex surface of the grip region. When the barrel retainer is coupled to the retaining mechanism, the gasket contacts the curved exterior of the lens barrel. The combination of the retaining mechanism and the barrel retainer prevents translation of the camera module to the retaining mechanism (and thus movement of the optical axis of the lens barrel) in two-dimensions (X and Y). In addition, as the camera module is held at the grip region of the lens barrel (and thus proximate to the center of gravity of the camera module), forces on the adhesive joints caused by the weight of the lens barrel (with one or more lens elements, e.g. plastic or glass elements) are mitigated.

The retaining mechanism further includes a planar surface that abuts the planar surface of the flange of the lens barrel when the grip region of the lens barrel is retained by the combination of the retaining mechanism and barrel retainer. The abutment of the planar surface of the flange of the lens barrel and the planar surface of the retaining mechanism prevents translation of the camera module along the optical axis of the lens (e.g., prevents translation of the lens barrel in Z relative to the retaining mechanism) within the camera assembly. The retaining mechanism and the barrel retainer further include slots and/or apertures that are configured to accept the pins of the lens holder, thereby constraining rotation of the camera module relative to the retaining mechanism about the optical axis of the lens (e.g., prevents rotation about Z).

Once the camera assembly is assembled, the camera assembly is positioned in the camera enclosure using a fixture, which constraints the X and Y position of the camera assembly (and thus camera module) relative to the camera enclosure. Fasteners are employed to secure position of the camera assembly in the camera enclosure in Z.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 7 is a side view of a camera assembly that includes the camera module and a retaining mechanism.

FIG. 8 is a perspective view of the camera assembly.

DETAILED DESCRIPTION

Figure 1:
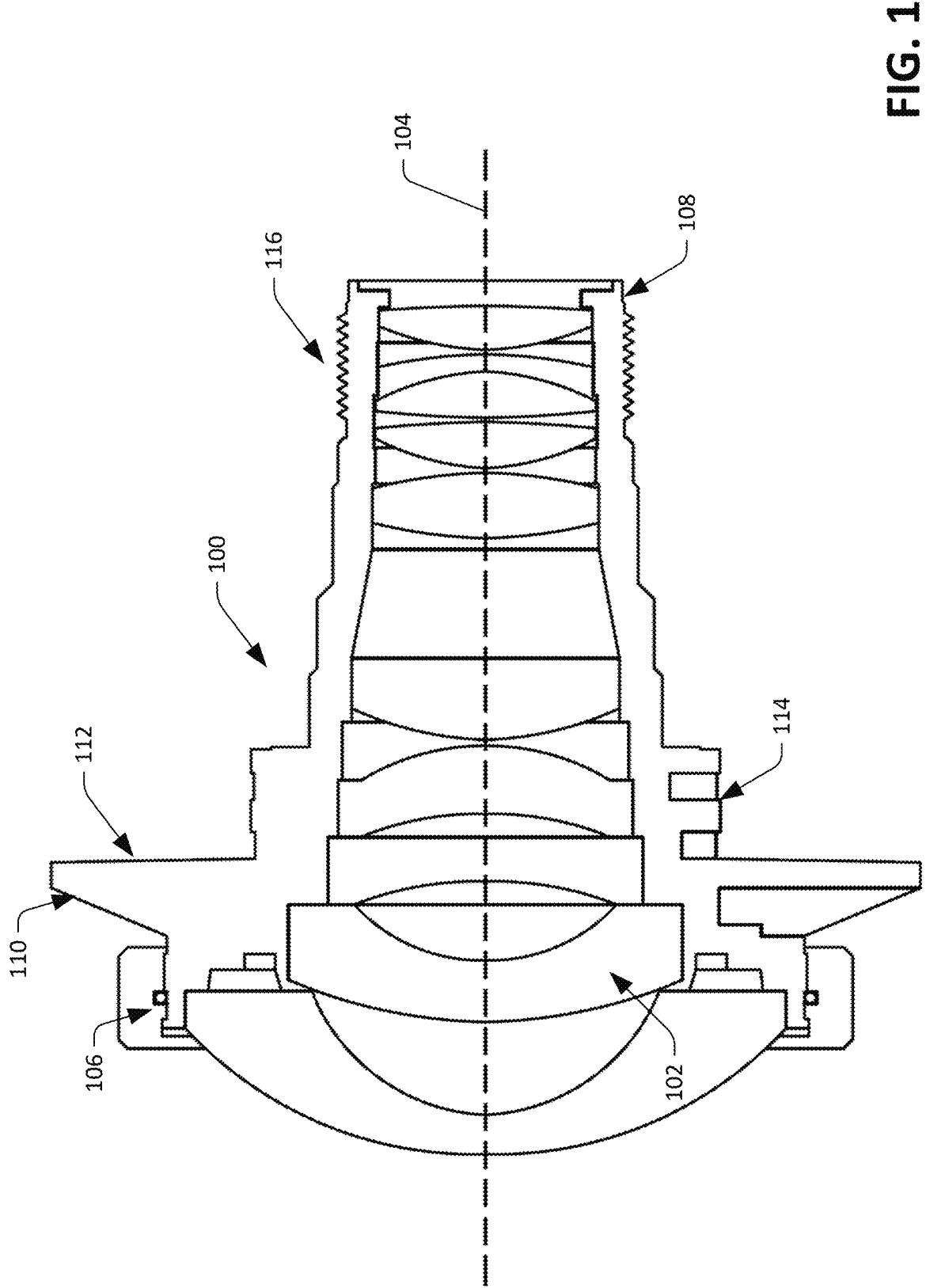
FIG. 1 is a cross-sectional view of a lens barrel.

Various technologies pertaining to a camera module that is well-suited for inclusion in a camera enclosure are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Described herein is a camera module that is configured to be fixed to a mounting surface (e.g., a chassis) of a camera enclosure, such that an alignment between an optical axis of a lens barrel and an image sensor of an image sensor board remains fixed over time. The camera module described herein is well-suited for use in a smart artificial intelligence (AI) camera that performs distortion correction on images captured by the camera. In a specific example, the camera module described herein is particularly well-suited for inclusion in a smart AI camera that is configured to perform dewarping on images captured by the camera.

Referring now to the drawings, FIG. 1 depicts a cross-sectional view of a lens barrel 100 that includes several lenses (including lens 102) positioned in an interior of the lens barrel 100, where optical axes of the lenses are aligned with one another, and further where a center axis (optical axis) 104 of the lens barrel 100 is coincident with the optical axes of the lenses (including an optical axis of the lens 102). The lens barrel 100 has a first end 106 and a second end 108 that is opposite the first end 106 along a length of the lens barrel 100.

The lens barrel 100 can include any suitable number of lenses. For instance, the lens barrel 100 may include between 1 and 20 lenses. In another example, the lens barrel 100 includes between 3 and 11 lenses. Pursuant to an example, the lens 102 (and other lenses in the lens barrel 100) is composed of glass. In another example, the lens 102 (and other lenses in the lens barrel 100) is composed of a transparent plastic. The lens barrel 100 has a circular cross section and is symmetric about the center axis 104 of the lens barrel 100. It is to be understood, however, that the lens barrel 100 may have a cross section of a different shape (such as ovular, square, hexagonal, etc.), and the lens barrel 100 may be asymmetric.

The lens barrel 100 additionally includes a flange 110 located at the first end 106 of the lens barrel 100. The flange 110 has a planar surface 112 that faces the second end 108 of the lens barrel 100. The lens barrel 100 additionally includes a grip region 114 that extends from the flange 110 away from the first end 106 of the lens barrel 100 and towards the second end 108 of the lens barrel 100. The diameter of the lens barrel 100 may taper in steps from the flange 110 of the lens barrel 100 towards the second end 108 of the lens barrel 100. Therefore, the diameter of the lens barrel 100 in the grip region 114 may be greater than a diameter of the lens barrel 100 at the second end 108 of the lens barrel 100.

The lens barrel 100 further includes a threaded region 116 that extends from the second end 108 of the lens barrel 100 towards the grip region 114.

Figure 3:
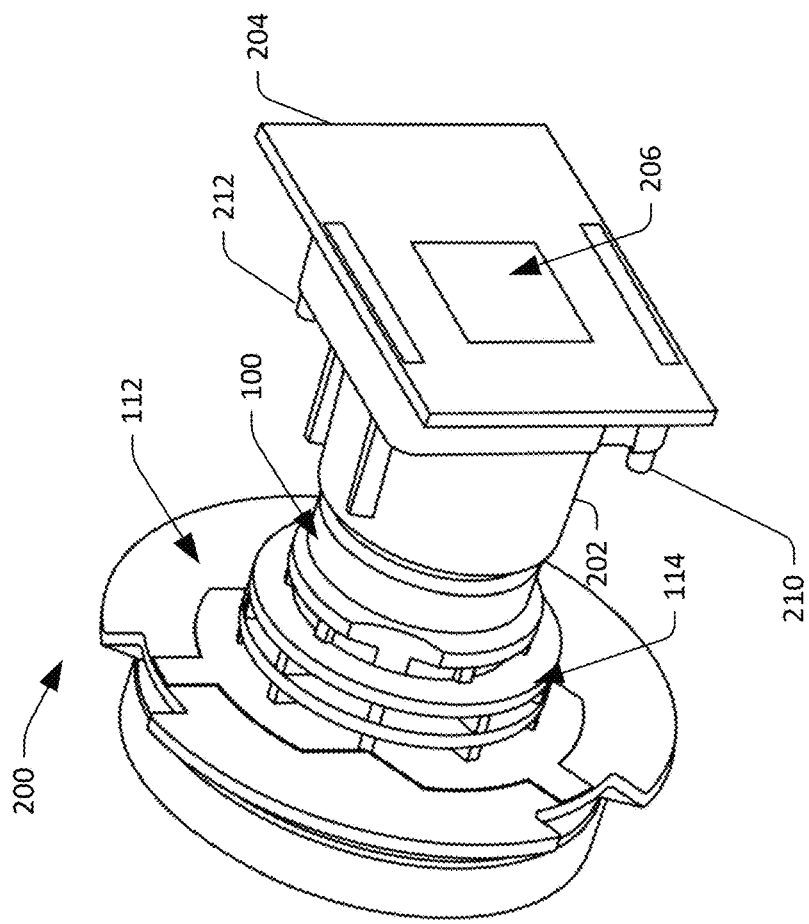
FIGS. 2 and 3 are perspective views of a camera module that includes a lens barrel, a lens holder, and an image sensor board.
Figure 2:
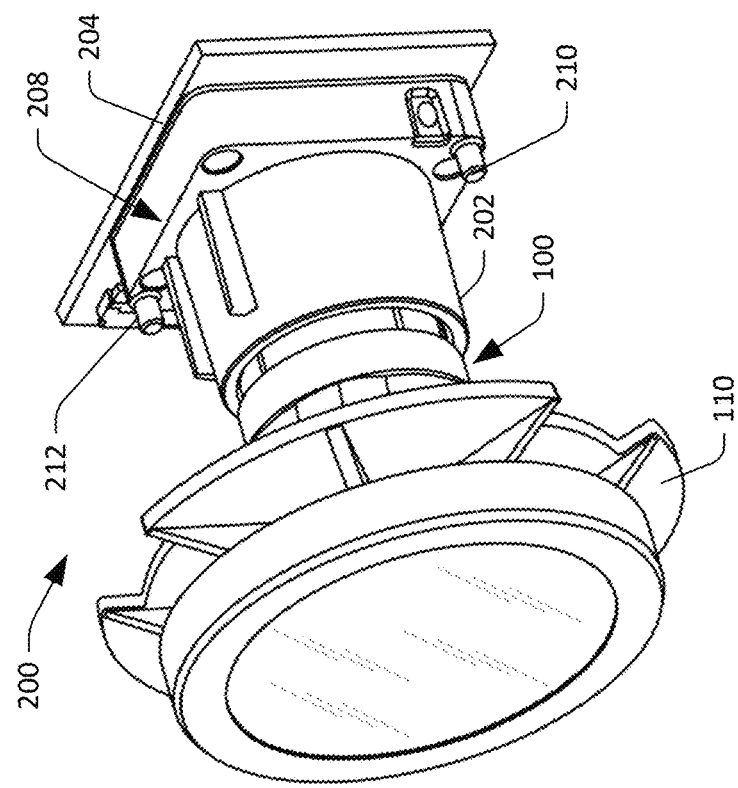
Figure 4:
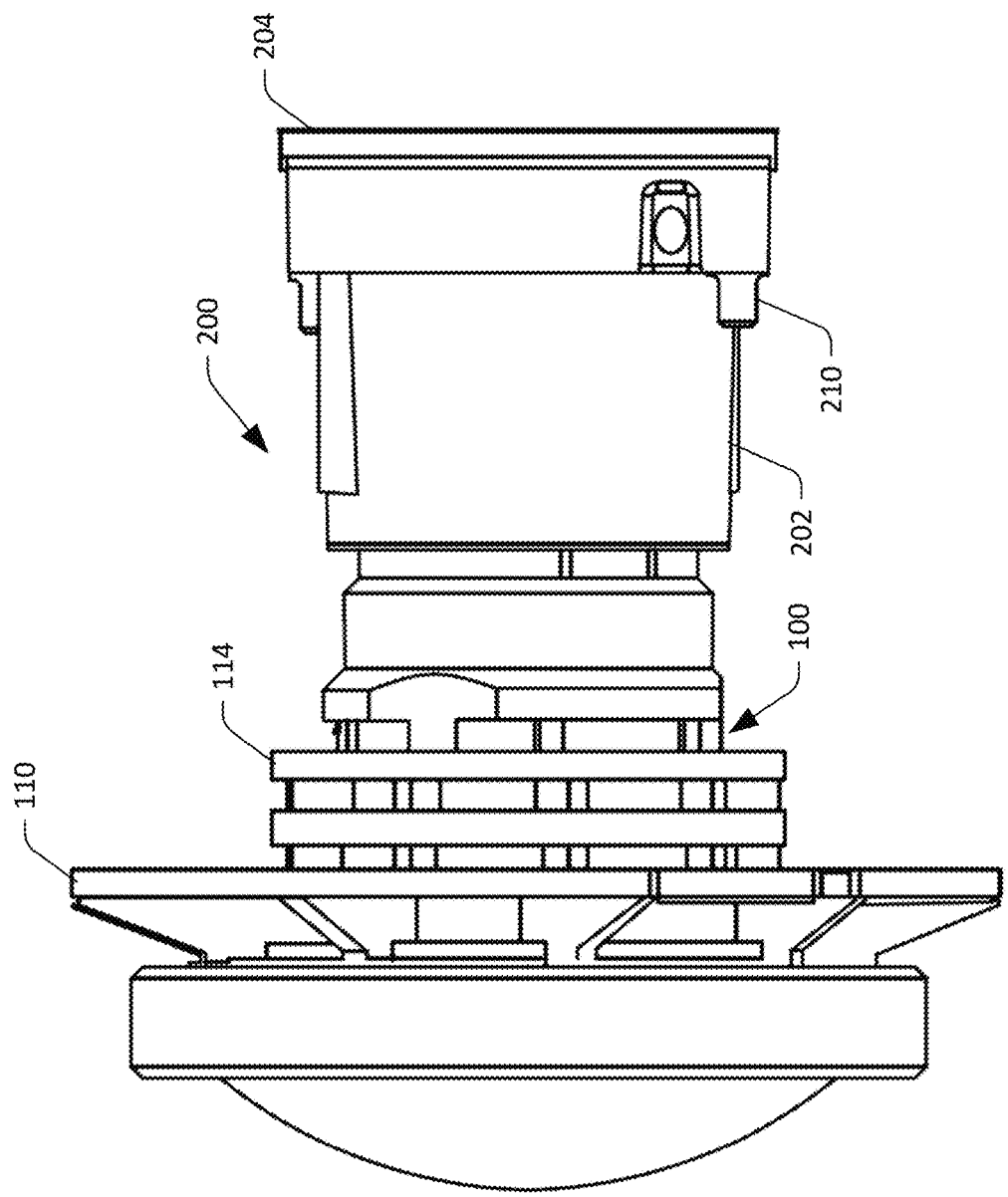
FIG. 4 is a side view of the camera module.
Figure 5:
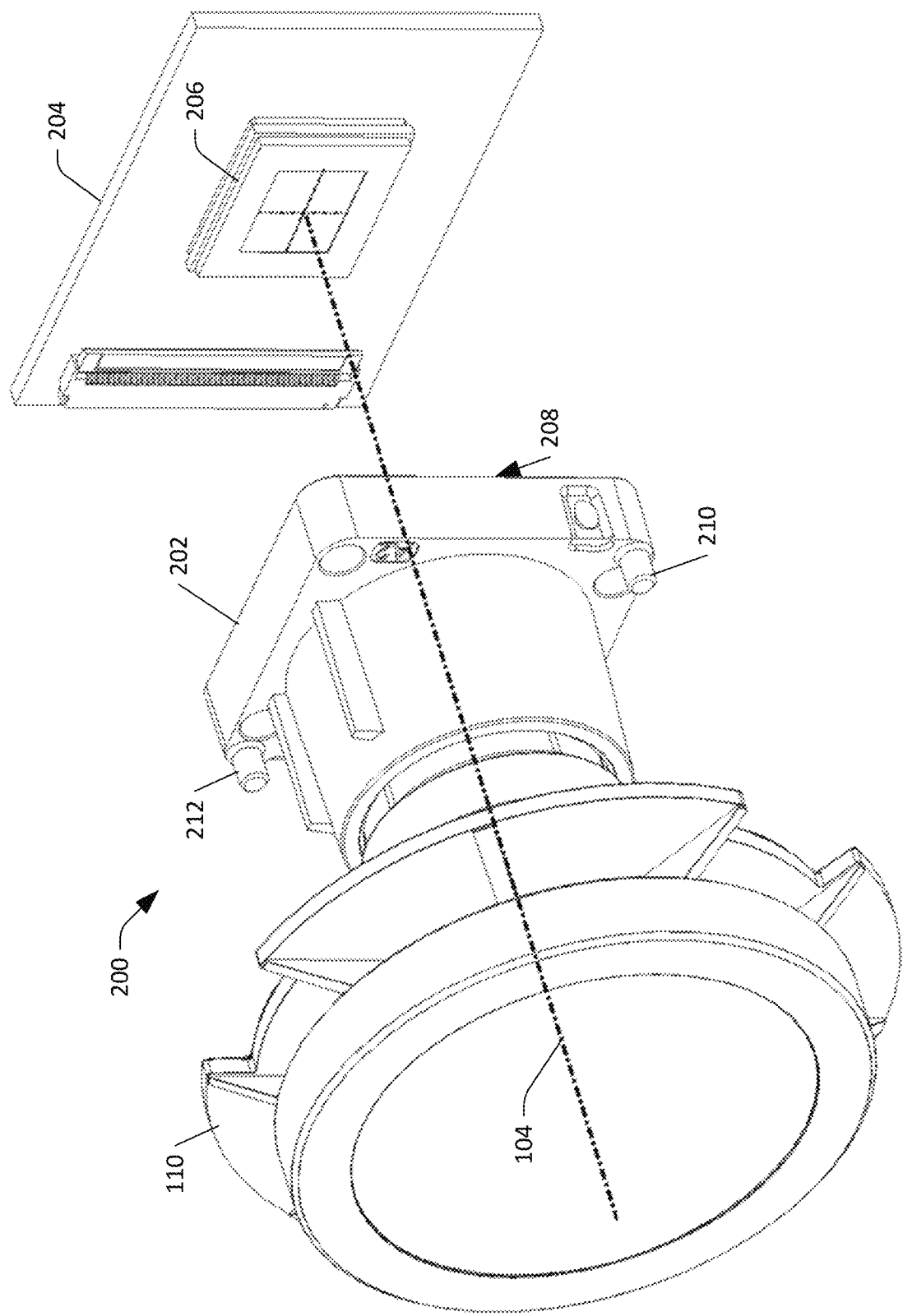
FIG. 5 is partially exploded view of the camera module.
Figure 6:
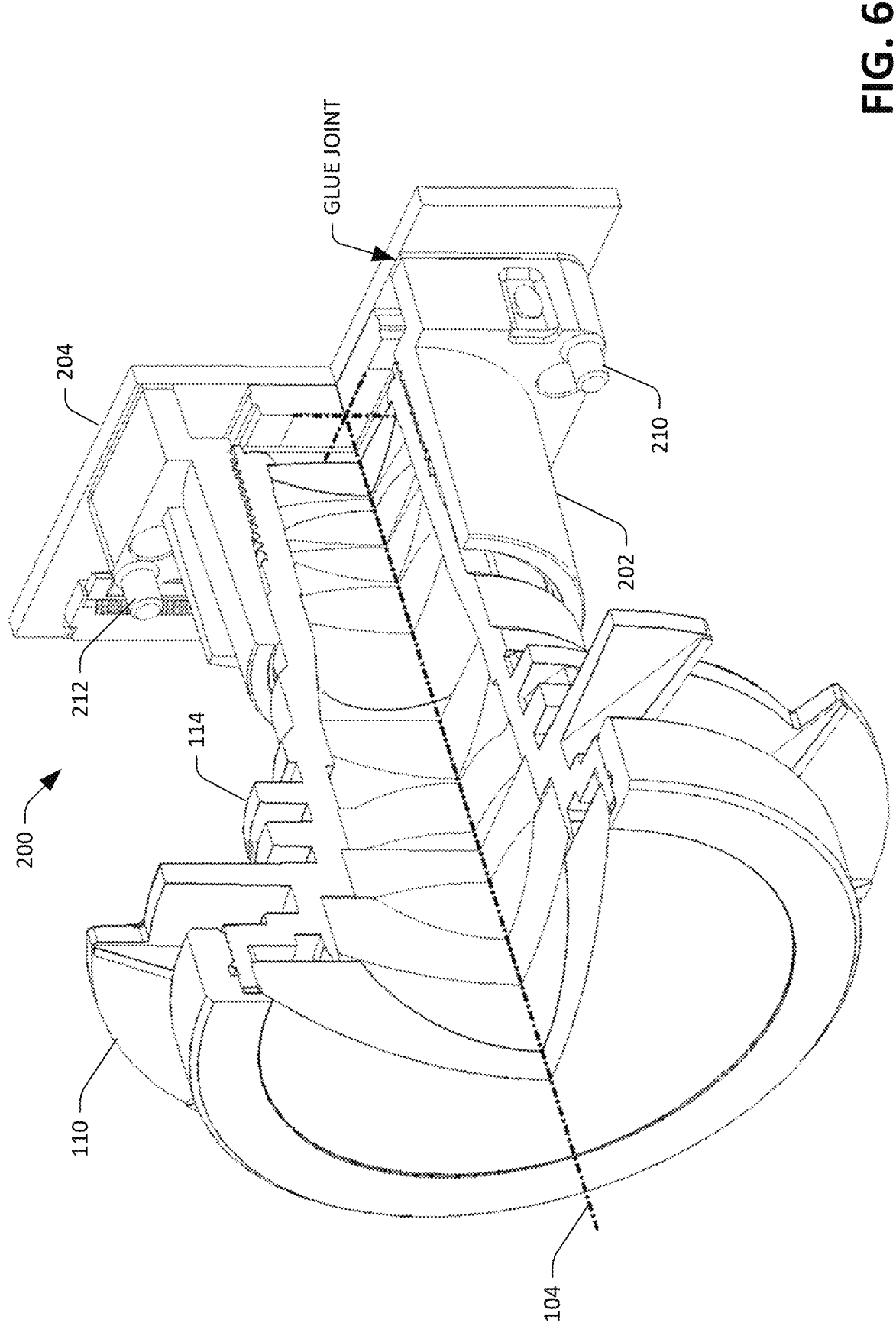
FIG. 6 is a cutaway view of the camera module.
Figure 10:
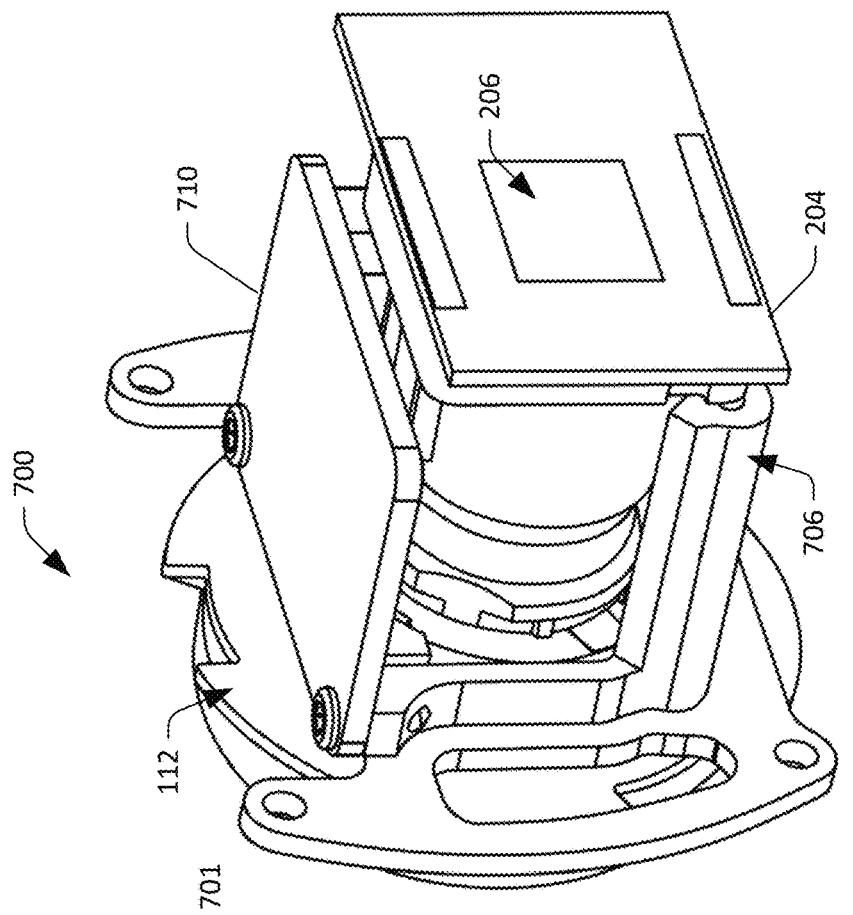
FIG. 10 is another perspective view of the camera assembly.
Figure 9:
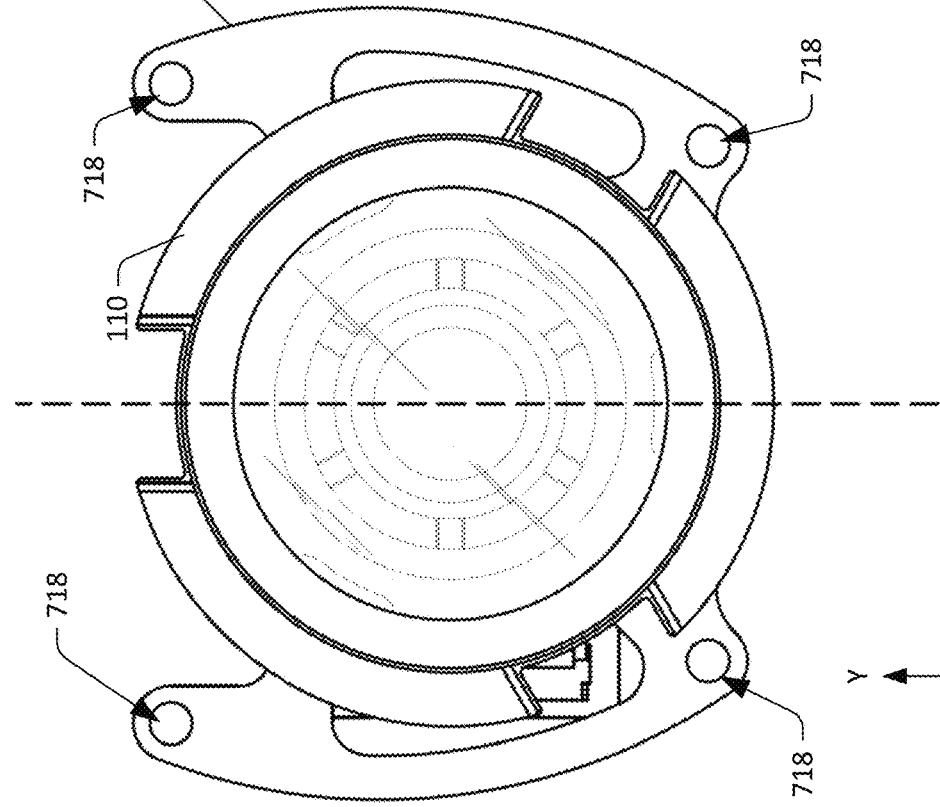
FIG. 9 is a front view of the camera assembly.

Turning now to FIGS. 2-6, views of a camera module 200 that includes the lens barrel 100 are depicted. FIGS. 2 and 3 are isometric views of the camera module 200 FIG. 4 is a side view of the camera module 200, FIG. 5 is a partially exploded view of the camera module 200, and FIG. 6 is a cutaway view of the camera module 200. The camera module 200 includes the lens barrel 100, a lens holder 202, and an image sensor board 204, where the lens barrel 100 is coupled to the lens holder 202, and the image sensor board 204 is coupled to the lens holder 202, where the image sensor board 204 has an image sensor 206 therein. The lens holder 202 is coupled to the lens barrel 100 at the second end 108 of the lens barrel 100. For example, the lens holder 202 includes a threaded recessed region that is configured to receive the threaded region 116 of the lens barrel 100, Hence, the lens barrel 100 is screwed into the lens holder 202. In other examples, the lens barrel 100 is coupled to the lens holder 202 by way of fasteners, such as threaded fasteners, rivets, etc.

The lens holder 202 has a base 208 that includes pins 210 and 212 that extend from the base 208 of the lens holder 202 towards the flange 110 of the lens barrel 100 when the lens barrel 100 is screwed into the lens holder 202.

The lens barrel 100, the lens holder 202, and the image sensor board. 204 are aligned with one another during an active alignment process, such that when alignment is complete, the center axis 104 of the lens barrel 100 intersects a center of the image sensor 206 of the image sensor board 204 (as depicted in FIG. 5), and the image sensor 206 is approximately orthogonal to the center axis 104 of the lens barrel 100. With more particularity, the lens barrel 100 is coupled (e.g., screwed into) the lens holder 202, and the lens barrel 100 (with the lens holder 202 coupled thereto) is positioned relative to a target in a scene such that the center axis 104 points to the target. The lens barrel 100 (and the lens holder 202) is then held at such position. The image sensor board 204 is subsequently positioned relative to the lens holder 202 such that the center axis 104 of the lens barrel 100 intersects the image sensor 206 at a center of the image sensor 206, and the image sensor 206 is approximately orthogonal to the center axis 104 of the lens barrel 100. Upon the image sensor board 204 being properly aligned with the lens barrel 100, ultraviolet (UV) adhesive is applied to interfaces between the image sensor board 204 and the lens holder 202 (as depicted in FIG. 6) and between the lens barrel 100 and the lens holder 202. Relative positions of the lens barrel 100, lens holder 202, and the image sensor board 204 are fixed upon the adhesive curing; however, external forces (such as a moment force between the image sensor board 204 and the lens holder 202 caused by weight of the lens barrel 100 and the lens holder 202) may weaken the adhesive joints, causing undesired movement of the lens barrel 100 relative to the image sensor 206. The technologies described below are well suited to constrain such undesired movement. A center of gravity of the camera module 200 is approximately coincident with the optical axis 104 of the lens barrel 100 and within the grip region 114 of the lens barrel 100.

FIGS. 7-14 depict an assembly 700 that includes the camera module 200, a retaining mechanism 701, and a barrel retainer 710, where kinematic mounting techniques are employed to constrain movement of the lens barrel 100 relative to the image sensor board 204, and to mitigate forces that are applicable at the adhesive joints referenced above. The retaining mechanism 701 is configured to restrict movement of the lens barrel 100. In the examples shown in FIGS. 7-14, the retaining mechanism 701 is a bracket. In another example that will be discussed below, the retaining mechanism 701 is a monolithic base that is configured to retain multiple lens barrels that are pointed in different directions.

Figure 11:
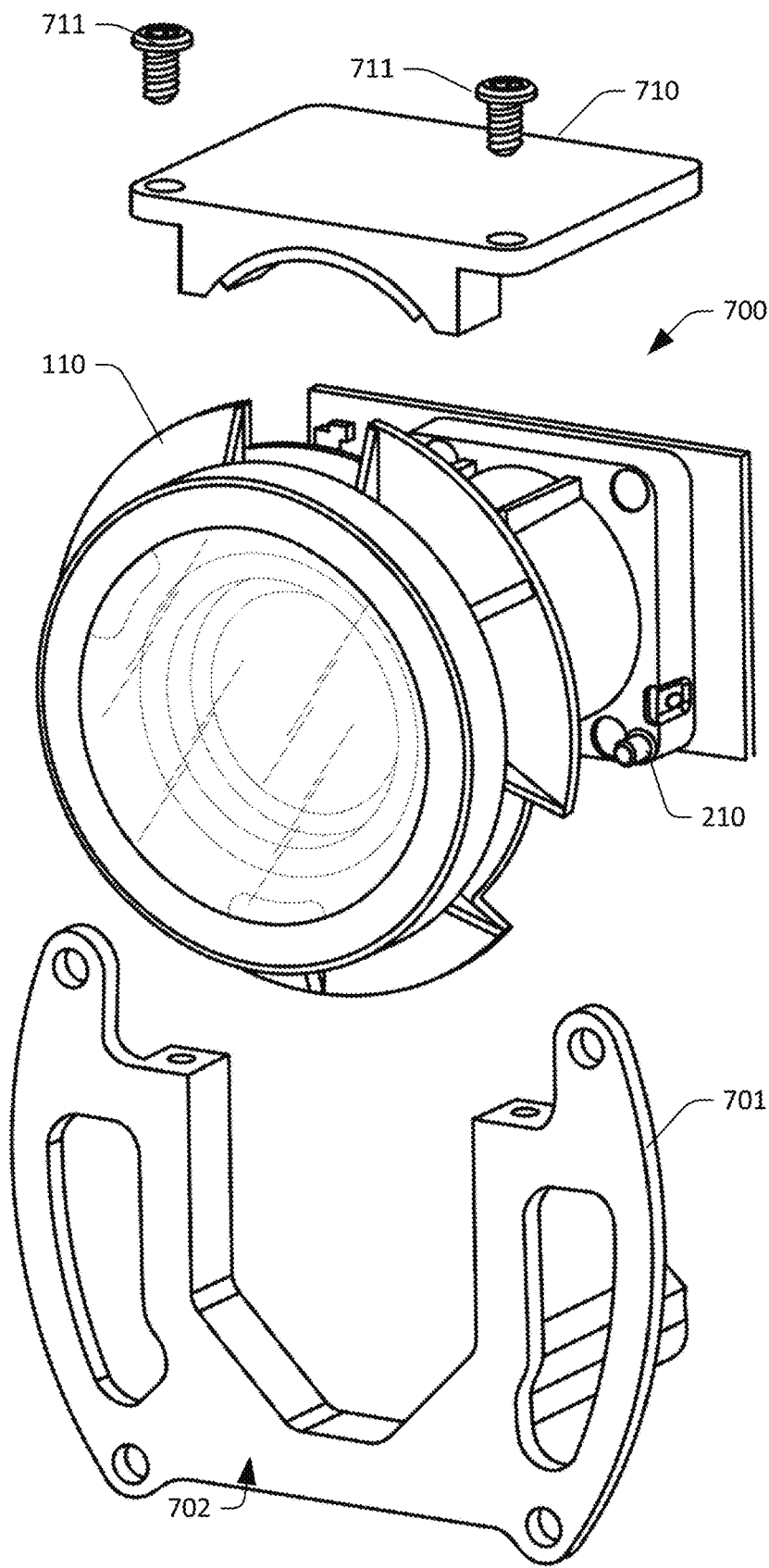
FIGS. 11 and 12 are exploded views of the camera assembly.
Figure 12:
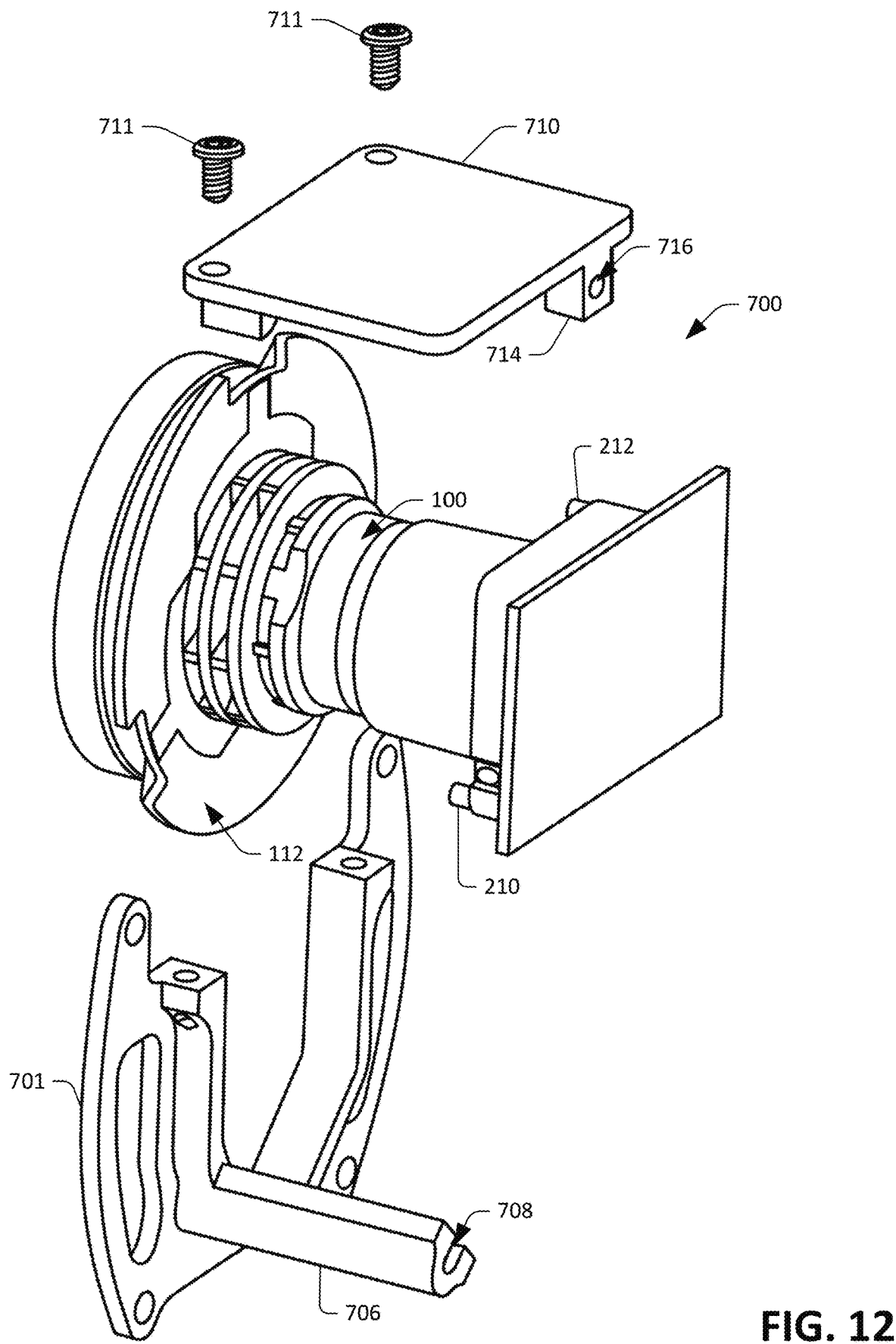
Figure 13:
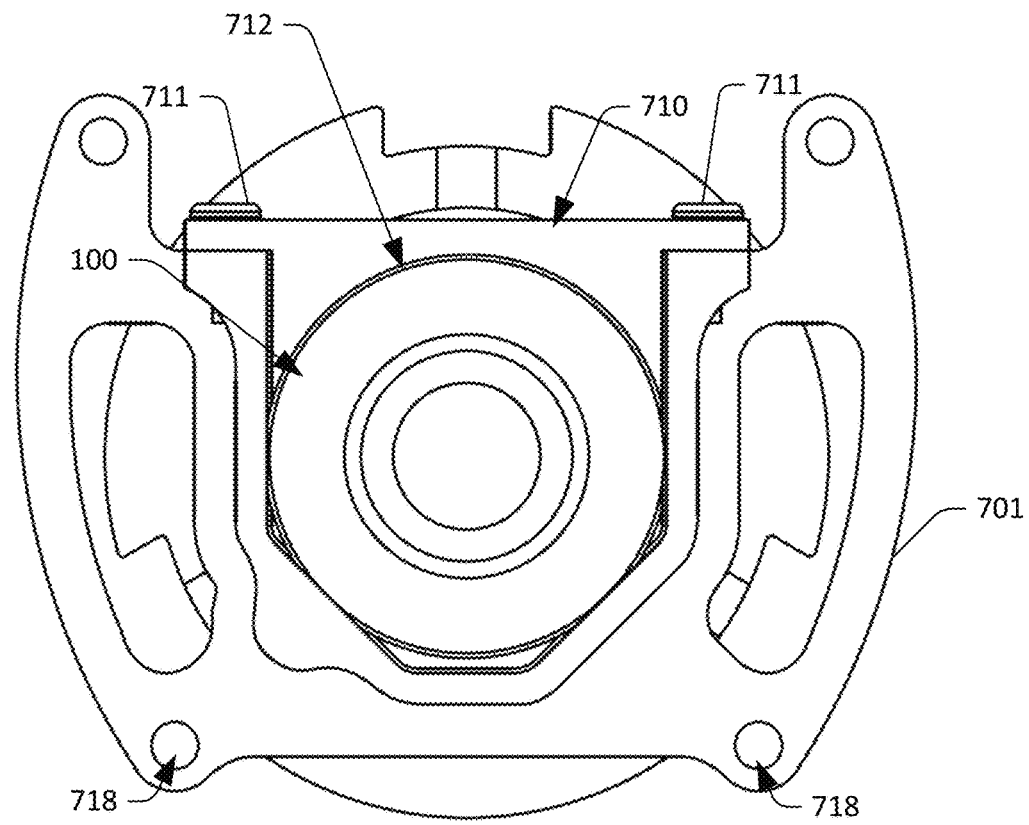
FIGS. 13 and 14 are cross-sectional views of the camera assembly.

As depicted in FIGS. 8, 10, 11, 12, and 13, the retaining mechanism 701 holds the lens barrel 100 at the grip region 114 of the lens barrel 100 to restrict movement of the lens barrel 100, the lens holder 202, and the image sensor board 204 relative to the retaining mechanism 701. As illustrated in FIG. 13, the retaining mechanism 701 can include a V-block, where the exterior of the lens barrel 100 at the grip region 114 is in contact with two of the planar surfaces of the V-block. In another embodiment, the retaining mechanism 701 may include a concave section that corresponds to the convex exterior of the lens barrel 100 at the grip region 114.

As depicted in FIG. 11, the retaining mechanism 701 further includes a planar surface 702 that, when the lens barrel 100 is held by the retaining mechanism 701 at the grip region 114, abuts the planar surface 112 of the flange 110 of the lens barrel 100 to constrain translation of the lens barrel 100 relative to the retaining mechanism 701 (e.g., constrain translation in Z). As illustrated in FIG. 12, the retaining mechanism 701 further has an extension 706 that extends away from the first end 106 of the lens barrel 100 and towards the base 208 of the lens holder 202 (and towards the second end 108 of the lens barrel 100). The extension 706 includes a slot 708, where the slot 708 is configured to accept the first pin 210 of the lens holder 202. Engagement of the first pin 210 and the slot 708 constrains rotation of the lens barrel 100 (and thus the lens holder 202 and the image sensor board 204) about the optical axis 104 of the lens barrel 100 relative to the restraining mechanism 701 (e.g., constrains rotation about Z).

The assembly 700 additionally includes a barrel retainer 710 that is attached to the retaining mechanism 701 by way of fasteners 711. For instance, as illustrated in FIG. 12, the barrel retainer 710 includes apertures and threaded fasteners are passed through the apertures. The retaining mechanism 701 can include correspondingly threaded recesses for receiving the fasteners 711. Thus, a compressive force is formed between the barrel retainer 710 and the retaining mechanism 701 as the barrel retainer 710 is fastened to the retaining mechanism 701.

As illustrated in the cross-sectional view through section A-A in FIG. 13, the barrel retainer 710 has a concave surface that corresponds to the convex exterior of the grip region 114 of the lens barrel 100. A gasket 712 is adhered to the concave surface of the barrel retainer 710 and is in contact with the convex exterior surface of the grip region 114 of the lens barrel 100. The fasteners 711 facilitate provision of a compressive force onto the lens barrel 100, thereby restricting translation of the lens barrel 100 (and the lens holder 202 and the image sensor board 204) in X, Y, and Z directions in the assembly 700, and further preventing the camera module 200 from tipping and/or tilting in the assembly 700.

Figure 14:
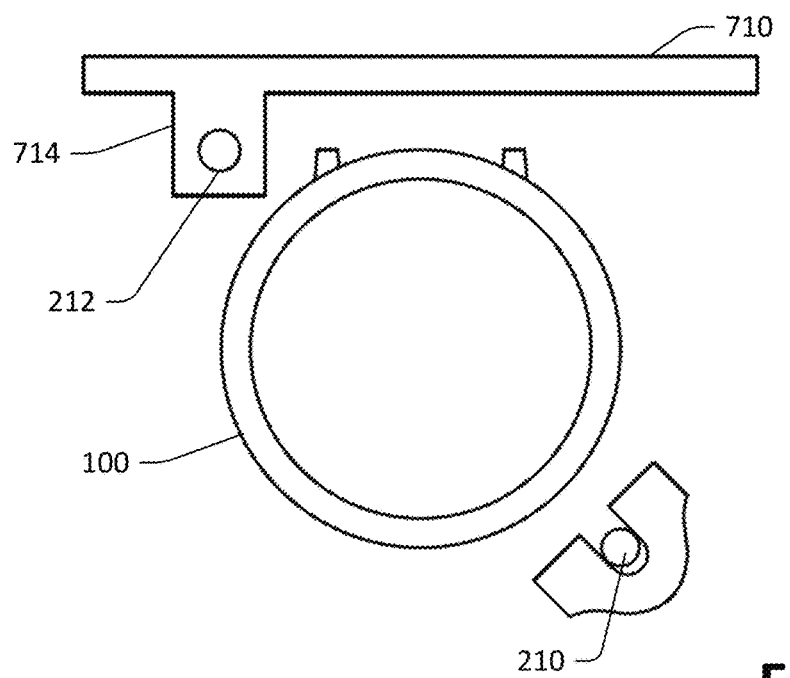

As is viewable in FIG. 12, the barrel retainer 710 extends from the planar surface 112 of the flange 110 to the planar surface of the base 208 of the lens holder 202. The barrel retainer 710 has an extension 714 that includes an aperture 716 that is configured to receive the second pin 212 of the lens holder 202. Engagement between the second pin 212 and the aperture 716 of the extension 714 further constrains rotation of the combination of the camera module 200 in Z relative to the retaining mechanism 701 and the barrel retainer 710. The cross-sectional view across section B-B shown in FIG. 14 depicts the pins 210 and 212 engaged with the slots 708 and the aperture 716, respectively, thereby constraining rotation of the camera module 200 within the assembly 700 about the optical axis 104 of the lens barrel 100.

As shown in FIG. 13, the retaining mechanism 701 may include apertures 718 by way of which fasteners can pass through and fasten the retaining mechanism 701 (and therefore fasten the assembly 700) to a mounting surface of a camera enclosure. Rubber isolation grommets can be placed between the retaining mechanism 701 and camera enclosure at the mounting apertures 718 to reduce the transmission of impact transmitted into the camera module 200 if the camera is jostled or dropped.

Figure 15:
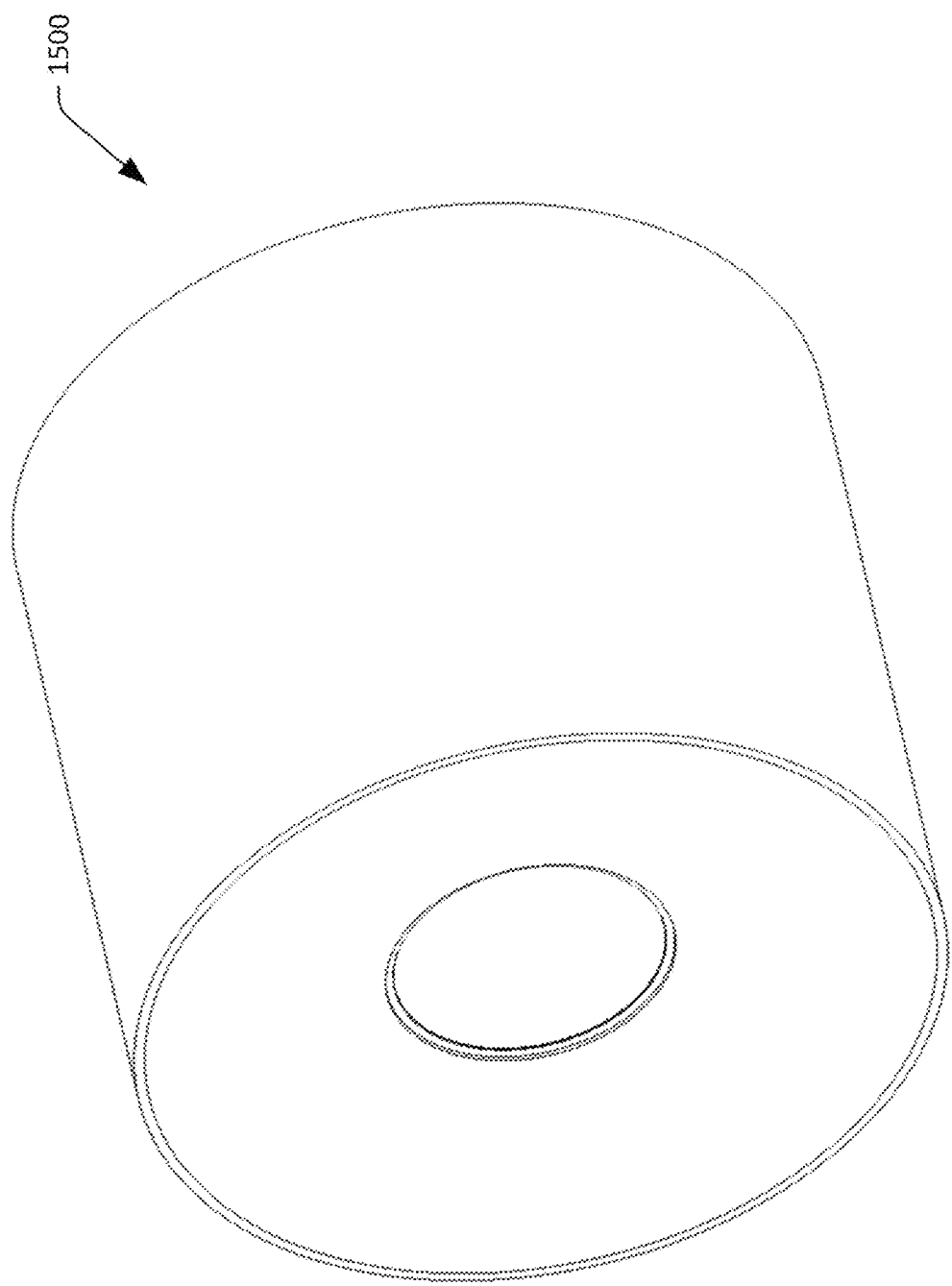
FIG. 15 is a perspective view of a camera enclosure that includes the camera assembly.

FIG. 15 depicts an example camera 1500 that may include the assembly 700.

Figure 16:
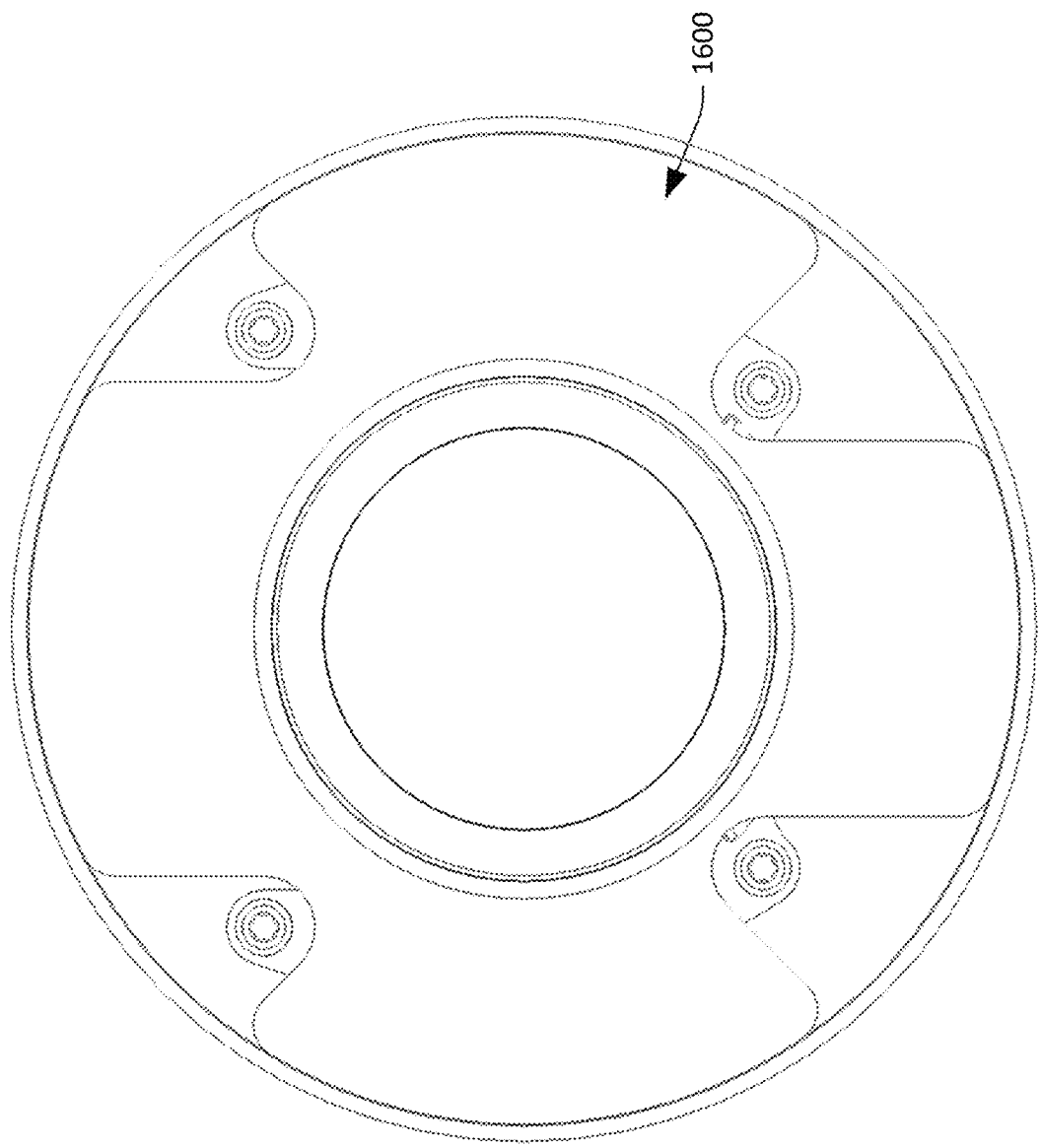
FIG. 16 is a front view of a fixture that is employable to position the camera assembly in the camera enclosure.

FIG. 16 depicts use of a fixture 1600 in connection with mounting the camera assembly 700 to an enclosure of a camera. The first end 106 of the lens barrel 100 is fit into an aperture 1602 of the fixture 1600. The fixture 1600 conformally fits into the enclosure, thereby securing the assembly 700 in X and Y directions relative to the camera enclosure. Fasteners (that extend through the apertures 718 of the assembly 700) secure the assembly 700 in the Z direction relative to the assembly 700, In another example embodiment, the fixture 1600 is optional, as securing the assembly 700 to the enclosure without the fixture 1600 allows for refined positioning in X and Y directions within the enclosure.

Advantages of the technologies described herein are now set forth. It is noted that the camera module 200 is held by the retaining mechanism 701 at the gripping region 114 of the lens barrel 100, the lens barrel 100 is fixed to the lens holder 202 with UV adhesive, and further the lens holder 202 is fixed to the image sensor board 204 with UV adhesive. The combination of the retaining mechanism 701 and the barrel retainer 710 constrains translation and rotation of the lens barrel 100 (and the lens holder 202 and image sensor board 204), thus facilitating maintenance of alignment between the lens barrel 100 and the image sensor 206. As the camera module 200 is held near its center of gravity by the retaining mechanism 701 and the barrel retainer 710, moment force at the adhesive joints is reduced when compared to conventional approaches. Therefore, if the camera 1500 is jostled or dropped, the lens barrel 100, the lens holder 202, and the image sensor board 204 do not move relative to one another, and thus the alignment between the lens barrel 100 and the image sensor 206 is maintained.

Figure 17:
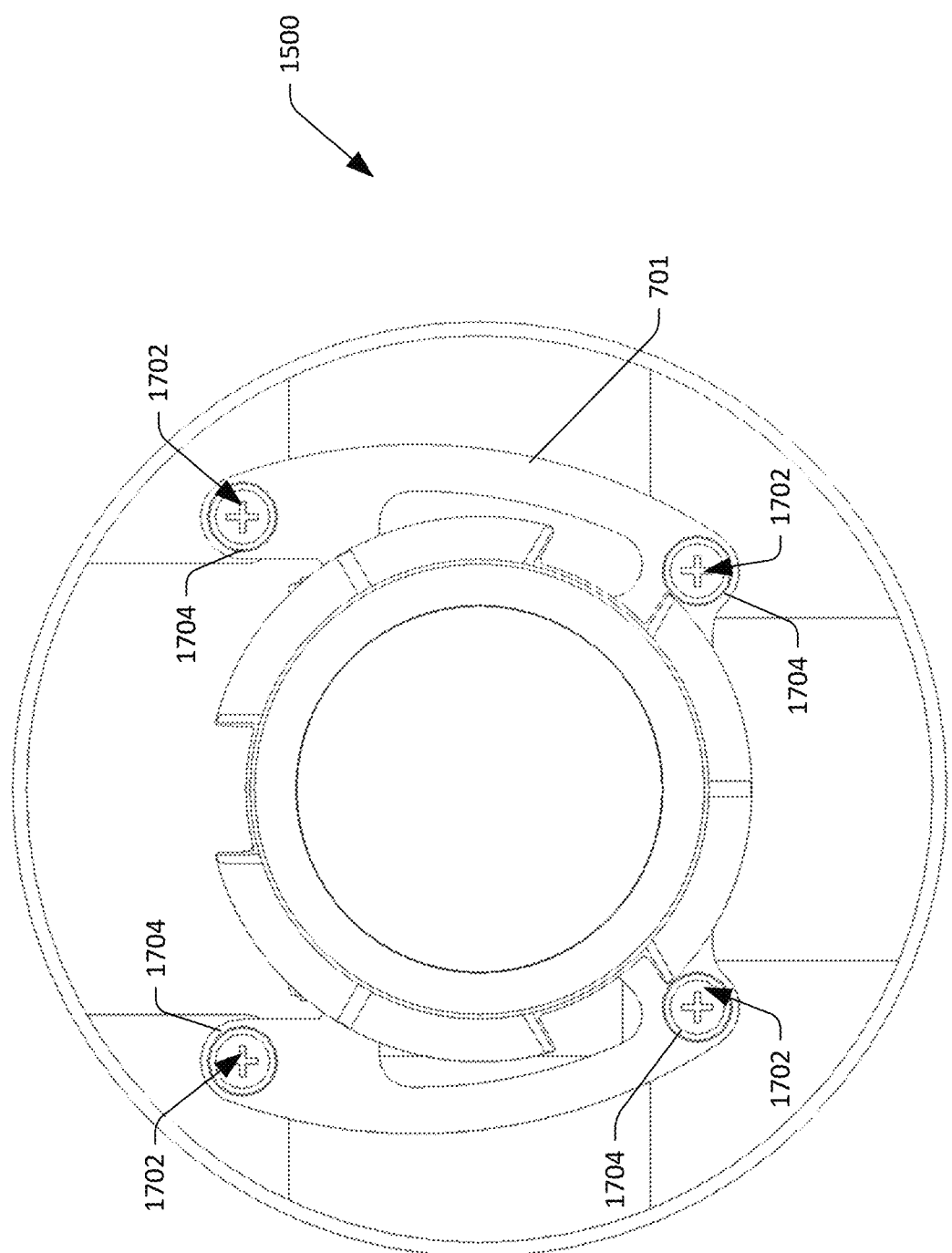
FIG. 17 is a front view of the camera assembly fitted into the camera enclosure.
Figure 18:
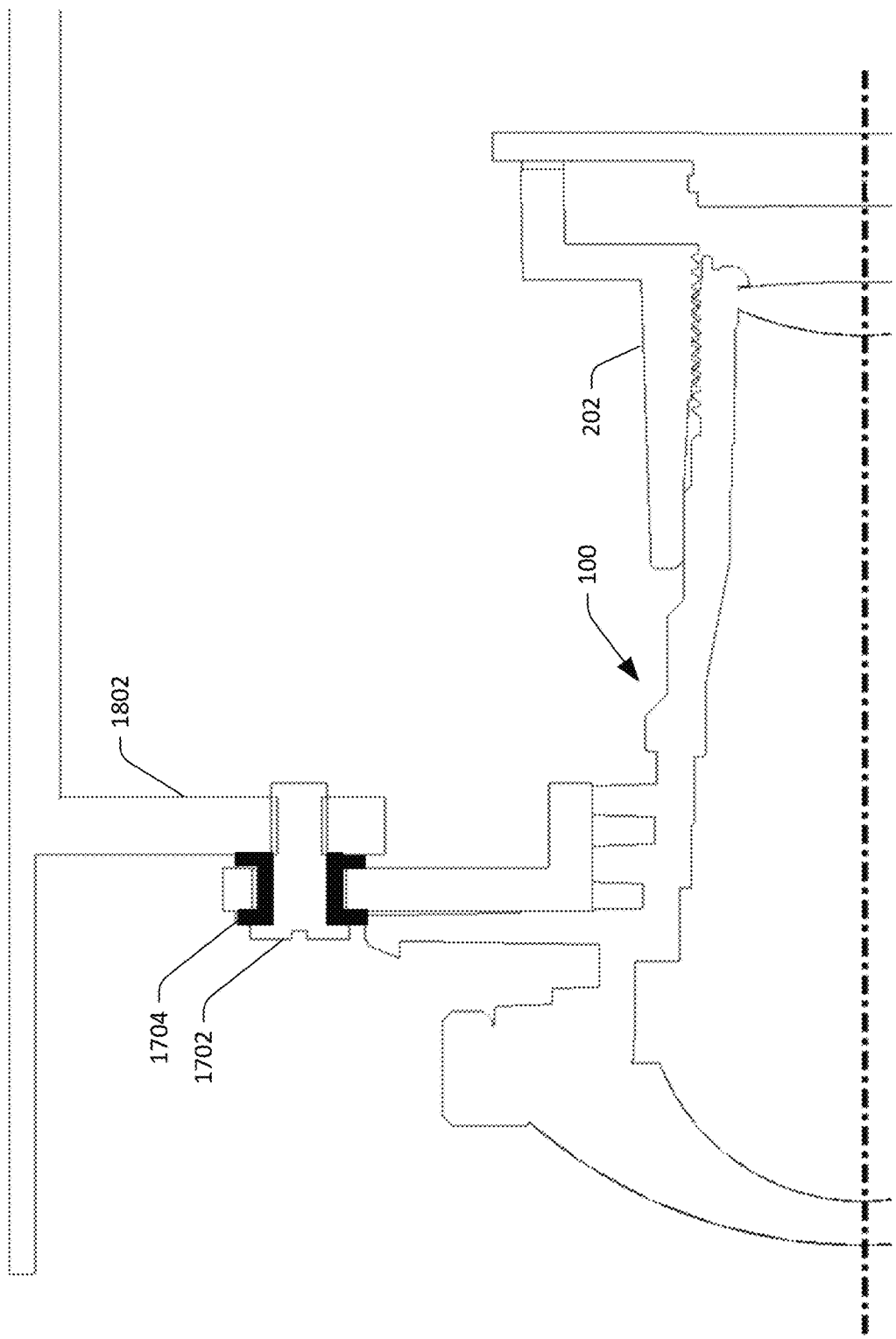
FIG. 18 is a cross-sectional view of the camera assembly in the enclosure.

FIG. 17 is an overhead view of the camera 1500, and FIG. 18 is a cross-sectional view of the camera 1500, where such figures are set forth to illustrate use of rubber isolation grommets that are configured to reduce transmission of impact into the camera module 500 if the camera 1500 is jostled or dropped. As shown, fasteners 1702 extended through the mounting apertures 718 and couple the assembly 700 to the camera 1500 at a mounting surface 1802 in the camera 1500. Rubber isolation grommets 1704 are placed between the retaining mechanism 701 and camera enclosure at the mounting apertures 718 to reduce the transmission of impact transmitted into the camera module if the camera 1500 is jostled or dropped.

Figure 19:
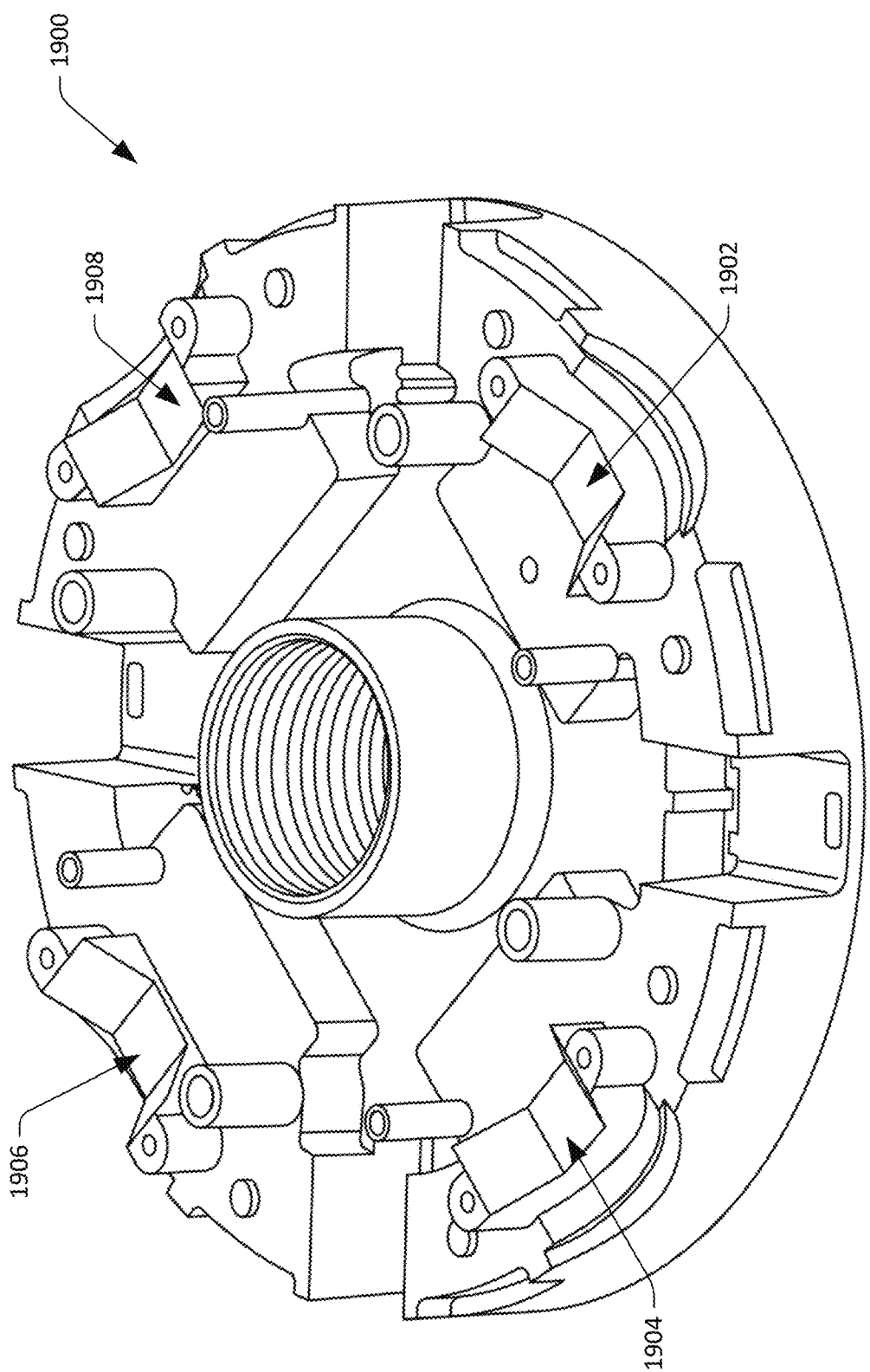
FIG. 19 is a perspective view of a retaining mechanism that is configured to retain several camera modules.

FIG. 19 illustrates another embodiment of the retaining mechanism 701. In the example shown in FIG. 19, the retaining mechanism 701 is a monolithic base 1900 that includes numerous V-blocks 1902-1908 that are configured to receive several respective camera modules. In the base 1900 depicted in FIG. 19, axes of lens barrels are directionally offset from one another by 90 degrees. The base 1900 is particularly well suited for applications when a camera system that includes the base 1900 is configured to generate 360-degree panoramic images (e.g., where images generated from four different cameras are stitched together). Utilization of the V-blocks 1902-1908 in the base 1900 ensures that the optical axis of lenses in the camera modules that are in contact with the V-blocks 1902-1908 lie in the same plane, such that images generated through use of the camera modules can be readily stitched to one another. While the base 1900 is illustrated as including four V-blocks, it is to be understood that the base 1900 may include fewer or more than four V-blocks.

Figure 20:
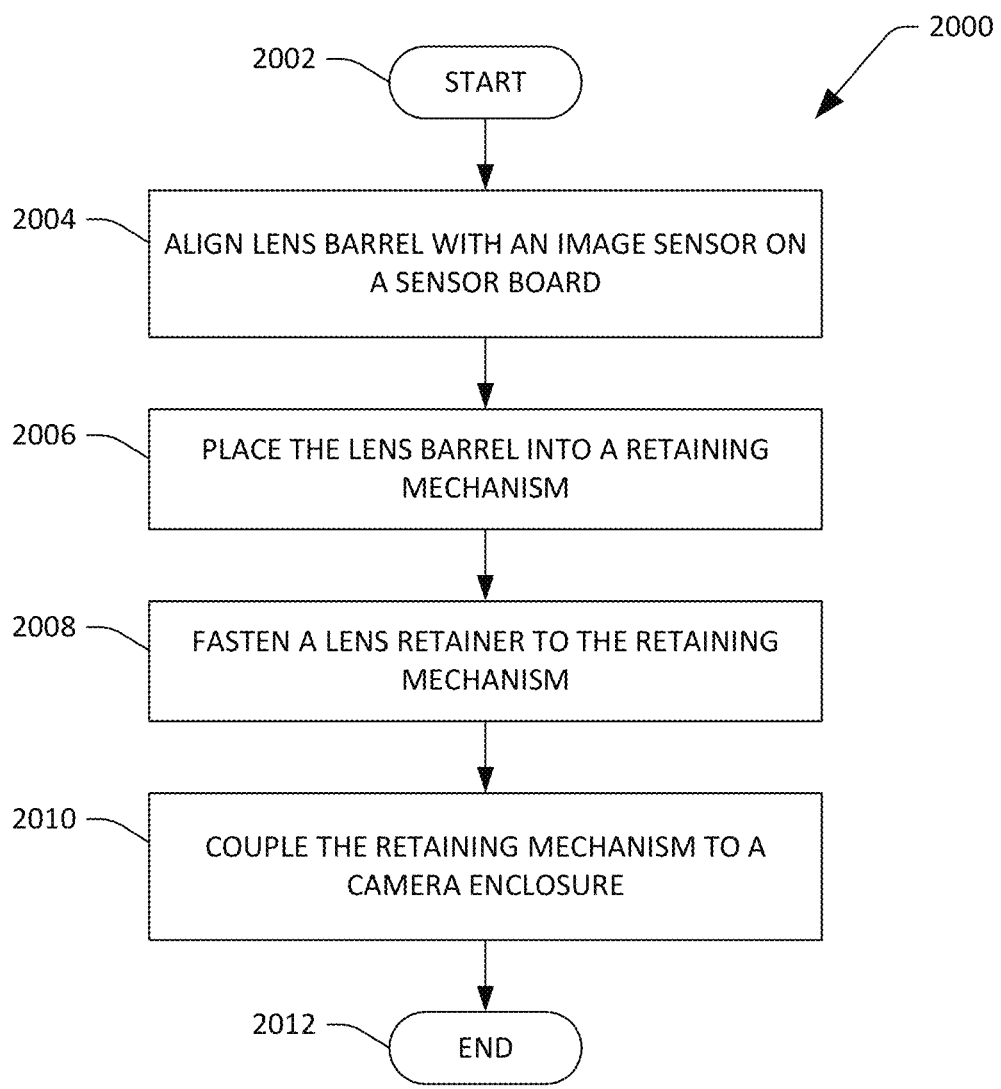
FIG. 20 is a flow diagram that illustrates a methodology for including a camera module with a retaining mechanism in a camera enclosure.

FIG. 20 illustrates an exemplary methodology 2000 for mounting a camera module to a mounting surface of a camera enclosure. While the methodology is shown and described as being a series of acts that are performed in a sequence, it is to be understood and appreciated that the methodology is not limited by the order of acts in the sequence. For example, some acts can occur in a different order than what is described herein. In addition, an act can occur concurrently with another act. Further, in some instances, not all acts may be required to implement a methodology described herein.

The methodology 2000 starts at 2002, and at 2004 active alignment is performed between an optical axis of lenses of a lens barrel and an image sensor mounted on an image sensor board, as described above. More specifically, the lens barrel is formed such that lenses therein have optical axes that are coincident with one another and are also coincident with a center axis of the lens barrel. The lens barrel is coupled to a lens holder (e.g., screwed into the lens holder) at a first end of the lens barrel, and an image sensor of an image sensor board is positioned adjacent to the image sensor board. The lens barrel is held at a fixed position, with the center axis of the lens barrel (and thus the axes of the lenses therein) pointed to a target; position of the lens holder and the image sensor are adjusted until appropriate alignment is achieved between the center axis of the lens barrel and the image sensor, whereupon the positions of the lens barrel, the lens holder, and the image sensor board are fixed relative to one another by applying adhesive at interfaces between such elements, thereby forming a camera module.

At 2006, the camera module is placed into a retaining mechanism, where the retaining mechanism comprises a V-block and a planar surface. The camera module is placed in the retaining mechanism such that a grip region of the lens barrel is in contact with surfaces of the V-block, and the planar surface of the retaining mechanism is in contact with (abutted to) a planar surface of a flange of the lens barrel. The flange is located at the second end of the lens barrel. An extension of the retaining mechanism engages with a pin of the lens holder to constrain rotation of the lens barrel about the optical axis of the lens relative to the retaining mechanism.

At 2008, a lens retainer is fastened to the retaining mechanism (to provide a compressive force on the lens barrel), where the lens retainer has a gasket adhered thereto, and further where the gasket is in contact with the grip region of the lens barrel when the lens retainer is fastened to the retaining mechanism. Coupling between the lens barrel and the surfaces of the V-block and the lens barrel and the gasket prevents translation of the camera module in directions that are orthogonal to the optical axis of the lens barrel (prevents rotation in X, Y, and Z).

At 2010, the retaining mechanism is coupled to a mounting surface of a camera enclosure. For instance, the retaining mechanism is coupled to a chassis in the camera enclosure, thereby fixing the position of the camera module in the camera enclosure. The methodology 2000 completes at 2012.

The features described herein relate to a camera assembly that is well-suited for use in a smart camera that performs dewarping, according to at least the examples provided below.

(A1) In one aspect, some embodiments include an assembly for including in a camera, where the assembly includes a camera module. The camera module includes a lens barrel having a first end and a second end that is opposite the first end, where the lens barrel includes: a) a lens positioned in an interior of the lens barrel, the lens having an optical axis; h) a flange at the first end of the lens barrel, the flange having a planar surface that faces the second end of the lens barrel; and c) a grip region that extends from the flange towards the second end of the lens barrel. The camera module also includes a lens holder coupled to the lens barrel at the second end of the lens barrel, the lens holder including a pin that extends from the lens holder towards the first end of the lens barrel. The camera assembly also includes a retaining mechanism, where the retaining mechanism is configured to hold the camera module at the grip region of the lens barrel to constrain translation of the camera module relative to the retaining mechanism in a plane that is orthogonal to the optical axis. The retaining mechanism has a planar surface that abuts the planar surface of the flange of the lens barrel to constrain translation of the camera module relative to the retaining mechanism along the optical axis of the lens. Additionally, the retaining mechanism has an extension that extends towards the lens holder and engages with the pin, where engagement of the extension with the pin constrains rotation of the camera module relative to the retaining mechanism about the optical axis of the lens.

(A2) in some embodiments of the camera assembly of A1, the retaining mechanism is a bracket.

(A3) In some embodiments of the camera assembly of any of A1-A2, the retaining mechanism includes a V-block that comprises a first planar surface and a second planar surface, where the lens barrel of the camera module is in contact with the first planar surface and the second planar surface of the V-block.

(A4) In some embodiments of the camera assembly of any of any of A1 or 43, the retaining mechanism is a monolithic base that holds several lens barrels.

(A5) in some embodiments of the camera assembly of any of AI-A4, a center of gravity of the camera module is within the grip region of the lens barrel.

(A6) In some embodiments of the camera assembly of any of A1-A5, the lens barrel has a circular cross section, where the lens barrel has a first diameter at the first end of the lens barrel and a second diameter at the second end of the lens barrel, the first diameter larger than the second diameter.

(A7) In some embodiments of the camera assembly of any of A1-A6, the camera assembly additionally includes a barrel retainer that is attached to the retaining mechanism by fasteners and a gasket that is adhered to the barrel retainer, where the gasket is in contact with the grip region of the lens barrel.

(A8) In some embodiments of the camera assembly of A7, the lens holder has a second pin extending therefrom, the barrel retainer includes an aperture, and the second pin is located in the aperture of the barrel retainer to further constrain rotation of the camera module relative to the retaining mechanism about the optical axis of the lens.

(A9) In some embodiments of the camera assembly of any of A1-A8, the lens is formed of glass.

(A10) In some embodiments of the camera assembly of any of A1-A9, the lens barrel comprises between three and eleven lenses.

(B1) In another aspect, some embodiments include a method for mounting an assembly to a mounting surface of a camera enclosure. The method includes forming a camera module, wherein forming the camera module includes coupling a first end of a lens barrel to a lens holder, where the lens barrel includes a lens that has an optical axis. The method further includes forming the assembly, where forming the assembly includes placing the camera module into a retaining mechanism, where the retaining mechanism comprises a V-block and a planar surface. The camera module is placed in the retaining mechanism such that a grip region of the lens barrel is in contact with surfaces of the V-block and the planar surface is in contact with a planar flange of the lens barrel. The planar flange is located at the second end of the lens barrel, and an extension of the retaining mechanism engages with a pin of the lens holder to constrain rotation of the camera module relative to the retaining mechanism about the optical axis of the lens. Forming the assembly also includes fastening a lens retainer to the retaining mechanism, where the lens retainer has a gasket, and the gasket is in contact with the grip region of the lens barrel when the lens retainer is fastened to the retaining mechanism. Coupling between the camera module and the surfaces of the V-block and the camera module and the gasket constrains translation of the camera module relative to the retaining mechanism in directions orthogonal to the optical axis. The method also includes mounting the assembly to the mounting surface of the camera enclosure subsequent to forming the assembly.

(B2) In some embodiments of the method of B1, forming the assembly additionally engaging an extension of the retaining mechanism with a second pin of the lens holder to constrain rotation of the camera module relative to the retaining mechanism about the optical axis of the lens.

(B3) In some embodiments of any of the methods of B1-B2, the retaining mechanism is a bracket, and the bracket has an aperture that extends therethrough, where mounting the assembly to the mounting surface of the camera enclosure further includes attaching the bracket to the camera enclosure by way of a fastener that extends through the aperture of the bracket.

(B4) In some embodiments of any of the methods of B1-B3, the lens barrel has a circular cross section.

(B5) In some embodiments of any of the methods of B1-B4, the first end of the lens barrel is threadedly coupled to the lens holder.

(B6) In some embodiments of any of the methods of B1-B5, a center of gravity of the camera module is within the grip region of the lens barrel.

(B7) In some embodiments of any of the methods of B1-B6, a rubber isolation grommet is placed between the retaining mechanism and the camera enclosure to reduce transmission of impact into the camera module when a camera that comprises the camera module is jostled or dropped.

(B8) In some embodiments of any of the methods of B1-B7, forming the assembly also includes placing multiple camera modules in the retaining mechanism.

(B9) In some embodiments of the method of B8, the multiple camera modules comprise four camera modules that have optical axes that are offset from one another by 90 degrees.

(C1) In another aspect, some embodiments include a camera assembly. The camera assembly includes a camera module, where the camera module includes a lens barrel. The lens barrel includes: a) a lens positioned in an interior of the lens barrel, the lens having an optical axis; b) a flange at a first end of the lens barrel, the flange having a planar surface that faces a second end of the lens barrel that is opposite the first end; and c) a grip region that extends from the flange towards the second end of the lens barrel. The camera module also includes a lens holder coupled to the second end of the lens barrel; where the lens holder includes a pin that extends from the lens holder towards the first end of the lens barrel. The camera also includes retaining means for restricting movement of the camera module relative to the retaining means.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore; to the extent that the term "includes" is used in either the detailed description or the claims, such term is intended to be inclusive in a manner similar to the term "comprising" as "comprising" is interpreted when employed as a transitional word in a claim.

What is claimed is:

1. An assembly for inclusion in a camera, the assembly comprising:
    a camera module, the camera module comprising:
        a lens barrel having a first end and a second end that is opposite the first end, the lens barrel comprising:
            a lens positioned in an interior of the lens barrel, the lens having an optical axis;
            a flange at the first end of the lens barrel, the flange having a planar surface that faces the second end of the lens barrel; and
            a grip region that extends from the flange towards the second end of the lens barrel, wherein a center of gravity of the camera module is within the grip region of the lens barrel; and
        a lens holder coupled to the lens barrel at the second end of the lens barrel, the lens holder comprises a pin that extends from the lens holder towards the first end of the lens barrel; and
    a retaining mechanism, wherein the retaining mechanism is configured to hold the camera module at the grip region of the lens barrel to constrain translation of the camera module relative to the retaining mechanism in a plane that is orthogonal to the optical axis, wherein the retaining mechanism has a planar surface that abuts the planar surface of the flange of the lens barrel to constrain translation of the camera module relative to the retaining mechanism along the optical axis of the lens, wherein the retaining mechanism has an extension that extends towards the lens holder and engages with the pin, and further wherein engagement of the extension with the pin constrains rotation of the camera module relative to the retaining mechanism about the optical axis of the lens.

2. The assembly of claim 1, wherein the retaining mechanism is a bracket.

3. The assembly of claim 1, wherein the retaining mechanism comprises a V-block that comprises a first planar surface and a second planar surface, and further wherein the lens barrel of the camera module is in contact with the first planar surface and the second planar surface of the V-block.

4. The assembly of claim 1, wherein the retaining mechanism is a monolithic base that holds several lens barrels.

5. The assembly of claim 1, wherein the lens barrel has a circular cross section, wherein the lens barrel has a first diameter at the first end of the lens barrel and a second diameter at the second end of the lens barrel, the first diameter larger than the second diameter.

6. The assembly of claim 1, further comprising:
    a barrel retainer that is attached to the retaining mechanism by fasteners; and
    a gasket that is adhered to the barrel retainer, wherein the gasket is in contact with the grip region of the lens barrel.

7. The assembly of claim 6, wherein the lens holder has a second pin extending therefrom, wherein the barrel retainer comprises an aperture, and further wherein the second pin is located in the aperture of the barrel retainer to further constrain rotation of the camera module relative to the retaining mechanism about the optical axis of the lens.

8. The camera module of claim 1, wherein the lens is formed of glass.

9. The camera module of claim 1, wherein the lens barrel comprises between three and eleven lenses.

10. A method for mounting an assembly to a mounting surface of a camera enclosure, the method comprising:
forming a camera module, wherein forming the camera module comprises:
coupling a first end of a lens barrel to a lens holder, wherein the lens barrel includes a lens that has an optical axis;
forming the assembly, wherein forming the assembly comprises:
placing the camera module into a retaining mechanism, wherein the retaining mechanism comprises a V-block and a planar surface, wherein the camera module is placed in the retaining mechanism such that a grip region of the lens barrel is in contact with surfaces of the V-block and the planar surface is in contact with a planar flange of the lens barrel, the planar flange is located at the second end of the lens barrel, and further wherein an extension of the retaining mechanism engages with a pin of the lens holder to constrain rotation of the camera module relative to the retaining mechanism about the optical axis of the lens;
fastening a lens retainer to the retaining mechanism, wherein the lens retainer has a gasket, wherein the gasket is in contact with the grip region of the lens barrel when the lens retainer is fastened to the retaining mechanism, and further wherein coupling between the camera module and the surfaces of the V-block and the camera module and the gasket constrains translation of the camera module relative to the retaining mechanism in directions orthogonal to the optical axis; and
mounting the assembly to the mounting surface of the camera enclosure subsequent to forming the assembly.

11. The method of claim 10, wherein forming the assembly further comprises engaging an extension of the retaining mechanism with a second pin of the lens holder to constrain rotation of the camera module relative to the retaining mechanism about the optical axis of the lens.

12. The method of claim 10, wherein the retaining mechanism is a bracket, wherein the bracket has an aperture that extends therethrough, and further wherein mounting the assembly to the mounting surface of the camera enclosure further comprises attaching the bracket to the camera enclosure by way of a fastener that extends through the aperture of the bracket.

13. The method of claim 10, wherein the lens barrel has a circular cross section.

14. The method of claim 10, wherein the first end of the lens barrel is threadedly coupled to the lens holder.

15. The method of claim 10, wherein a center of gravity of the camera module is within the grip region of the lens barrel.

16. The method of claim 10, wherein a rubber isolation grommet is placed between the retaining mechanism and the camera enclosure to reduce transmission of impact into the camera module when a camera that comprises the camera module is jostled or dropped.

17. The method of claim 10, wherein forming the assembly further comprises placing multiple camera modules in the retaining mechanism.

18. The method of claim 17, wherein the multiple camera modules comprise four camera modules that have optical axes that are offset from one another by 90 degrees.

19. An assembly for inclusion in a camera, the assembly comprising:
a camera module, the camera module comprising:
a lens barrel having a first end and a second end that is opposite the first end, the lens barrel comprising:
a lens positioned in an interior of the lens barrel, the lens having an optical axis;
a flange at the first end of the lens barrel, the flange having a planar surface that faces the second end of the lens barrel; and
a grip region that extends from the flange towards the second end of the lens barrel; and
a lens holder coupled to the lens barrel at the second end of the lens barrel, the lens holder comprises a pin that extends from the lens holder towards the first end of the lens barrel; and
a retaining mechanism, wherein the retaining mechanism is configured to hold the camera module at the grip region of the lens barrel to constrain translation of the camera module relative to the retaining mechanism in a plane that is orthogonal to the optical axis, wherein the retaining mechanism has a planar surface that abuts the planar surface of the flange of the lens barrel to constrain translation of the camera module relative to the retaining mechanism along the optical axis of the lens, wherein the retaining mechanism has an extension that extends towards the lens holder and engages with the pin, wherein engagement of the extension with the pin constrains rotation of the camera module relative to the retaining mechanism about the optical axis of the lens, and further wherein the retaining mechanism is a monolithic base that holds several lens barrels.

20. The camera assembly of claim 19, wherein the lens barrel has a circular cross section, wherein the lens barrel has a first diameter at the first end of the lens barrel and a second diameter at the second end of the lens barrel, the first diameter larger than the second diameter.

* * * * *